C. H. Platt.
Gate.
No. 72897  Patented Dec. 31, 1867.
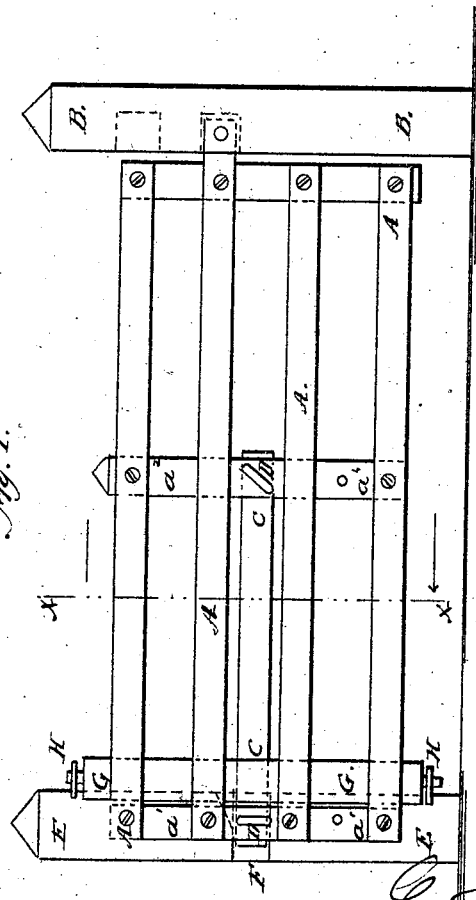

United States Patent Office.

C. H. PLATT, OF NORTH FAIRFIELD, OHIO.

Letters Patent No. 72,897, dated December 31, 1867.

IMPROVEMENT IN GATES.

The Schedule referred to in these Letters Patent and making part of the same.

TO ALL WHOM IT MAY CONCERN:

Be it known that I, C. H. PLATT, of North Fairfield, in the county of Huron, and State of Ohio, have invented a new and useful Improvement in Gates; and I do hereby declare that the following is a full, clear, and exact description thereof, which will enable others skilled in the art to make and use the same, reference being had to the accompanying drawings, forming part of this specification.

Figure 1 is a side view of my improved gate.

Figure 2 is a vertical cross-section of the same, taken through the line $x$ $x$, fig. 1.

Similar letters of reference indicate corresponding parts.

My invention has for its object to furnish an improved gate, simple in construction, durable, and not liable to get out of order, and which may be adjusted to swing at a higher or lower level, or secured in such a position as to allow sheep or small stock to pass freely beneath it; and it consists in the supporting-bar, removably and adjustably attached to the gate; in notching the rear post upon two sides, for the reception of the supporting-bar; and in the manner in which the vertical pivoted bar is combined with the gate, adjustable bar, and post, the whole being constructed and arranged as hereinafter more fully described.

A is the gate, the forward end of one of the horizontal bars of which projects, so as to enter one or the other of the mortises formed in the side of the front gate-post B for its reception, according as it is desired to have the gate swing at a higher or lower level, where it may be secured in place by a pin or other convenient device. C is a horizontal bar, which is secured to the inner sides of the rear and central vertical bar $a^1$ and $a^2$ of the gate, by screws, bolts, or pins, D, so that the said bar may be adjusted or attached to the said bars $a^1$ and $a^2$, at a greater or less distance from the lower edge of the gate A, according to the height at which it is desired that the gate should swing, two or more sets of holes being made in the said bars $a^1$ and $a^2$, for the reception of the pins, bolts, or screws, D. E is the rear post, the inner and front sides of which, at or near its middle part, have notches, F, formed in them, for the reception of the supporting-bar C, which remains constantly in said notches, both when the gate is sliding back and forth, and when it is swinging around. G is a vertical bar, the ends of which are pivoted to eye-bolts, H, or other supports attached to the post E, as shown in figs. 1 and 2. The bar G passes between the horizontal bars of the gate A and the horizontal supporting-bar C, so as to pivot the said gate to the post E, and at the same time allow it to slide back and forth, or be moved up and down upon the said pivoting-bar G.

When it is desired to adjust the gate A to swing at a higher or lower level, the pins D are removed, the gate A moved up or down, and the said pins again inserted, securing the gate to the bar C. When it is desired to secure the gate in such a position that sheep or small stock may pass back and forth beneath it, the bar C is removed, and the rear pin D passed into a hole (shown in dotted lines in fig. 2,) in the post E. The upper side of the notches F, at the corner of the post E, where said notches meet, may be bevelled off, as shown in fig. 2, and in dotted lines in fig. 1, to allow the forward end of the gate to be raised, if desired.

I claim as new, and desire to secure by Letters Patent—

Forming notches, F, in two sides of the rear gate-post E, for the reception of the supporting-bar C, substantially as herein shown and described.

The above specification of my invention signed by me, this 13th day of August, 1867.

C. H. PLATT.

Witnesses:
D. H. PLATT,
N. M. PLATT.